United States Patent
Palley

(10) Patent No.: US 7,156,609 B2
(45) Date of Patent: Jan. 2, 2007

(54) METHOD OF MAKING COMPLEX TWISTED BLADES WITH HOLLOW AIRFOIL CROSS SECTION AND THE TURBINES BASED ON SUCH

(75) Inventor: Igor Palley, Madison, NJ (US)

(73) Assignee: GCK, Inc., San Antonio, TX (US)

( * ) Notice: Subject to any disclaimer, the term of this patent is extended or adjusted under 35 U.S.C. 154(b) by 88 days.

(21) Appl. No.: 10/715,963

(22) Filed: Nov. 18, 2003

(65) Prior Publication Data

US 2005/0106023 A1    May 19, 2005

(51) Int. Cl.
*F03D 7/06* (2006.01)
*B23P 15/04* (2006.01)

(52) U.S. Cl. .................. 415/4.2; 415/907; 416/132 B; 29/889.21

(58) Field of Classification Search ................. 415/4.2, 415/4.4, 907; 416/132 B, 132 R, 242, 243, 416/DIG. 2; 290/44, 55; 29/889.21, 889.23, 29/889.71
See application file for complete search history.

(56) References Cited

U.S. PATENT DOCUMENTS

| | | | | | |
|---|---|---|---|---|---|
| 958,599 | A | * | 5/1910 | Cooksey | 416/238 |
| 1,851,680 | A | * | 3/1932 | Morris | 416/195 |
| 2,106,928 | A | * | 2/1938 | Lee | 416/178 |
| 3,588,273 | A | * | 6/1971 | Kizilos | 416/42 |
| 4,236,866 | A | * | 12/1980 | Zapata Martinez | 415/4.4 |
| 4,237,384 | A | * | 12/1980 | Kennon | 290/55 |
| 4,718,821 | A | * | 1/1988 | Clancy | 416/44 |
| 5,263,846 | A | * | 11/1993 | Smith | 416/36 |
| 5,405,246 | A | * | 4/1995 | Goldberg | 416/227 A |
| 5,451,137 | A | | 9/1995 | Gorlov | |
| 5,570,859 | A | * | 11/1996 | Quandt | 244/213 |
| 6,766,623 | B1 | * | 7/2004 | Kalnay | 52/641 |

* cited by examiner

*Primary Examiner*—Edward K. Look
*Assistant Examiner*—Devin Hanan
(74) *Attorney, Agent, or Firm*—Jackson Walker, LLP

(57) ABSTRACT

A reactive turbine, each blade of which approximates a helical shape that is constructed with readily available conventional manufacturing techniques. The blades are constructed in discrete straight sections that, when joined, approximate a helix or any other efficient turbine shape. Each section is manufactured with the well known and readily available machine shop techniques of shaping, forming, and joining with welds or fasteners.

34 Claims, 6 Drawing Sheets

US 7,156,609 B2

METHOD OF MAKING COMPLEX TWISTED BLADES WITH HOLLOW AIRFOIL CROSS SECTION AND THE TURBINES BASED ON SUCH

FIELD OF THE INVENTION

The present invention pertains to the field of unidirectional reaction turbines capable of operation under the influence of reversible fluid flows.

BACKGROUND OF THE INVENTION

Wind and water-driven devices have been used for centuries for conversion of naturally occurring phenomena into useful power. Advances in aerodynamics and materials science have increased the efficiency and decreased the weight and friction of these devices, and concomitantly increased their usefulness. Turbine blades have progressed from primitive paddle wheels to space-age shapes with complex compound curves that require sophisticated manufacturing techniques such as numerically-controlled laser cutting, composite molding, casting, and powder metallurgy. Until demand drives production to very high levels, such manufacturing requirements make high-efficiency turbines prohibitively expensive, particularly in developing nations where wind and water could provide much-needed power sources.

SUMMARY OF THE INVENTION

The present invention provides a means to economically utilize the advances in reactive turbine blade design. The present invention enables construction of turbine blades with complicated cross sections and non-planar configurations using conventional manufacturing techniques such as bending, shaping, forming, and welding. One embodiment of the present invention is a blade made of several discrete airfoil sections, fabricated from metal sheets, twisted and joined to form a complete blade the shape of which, as the number of discrete sections increases, approaches the helical blade design disclosed in U.S. Pat. No. 5,451,137 issued to Gorlov or the S-blade design of a troposkein disclosed in the U.S. Pat. No. 5,405,246 issued to Goldberg.

The present invention satisfies a long-standing need for a method by which the high efficiencies of modern turbines, made possible by the utilization of complex aerodynamic blade designs, may be approximated with conventional manufacturing resources. Such approximations of modern blades can approach the efficiencies available to industrialized economies at a cost affordable in struggling economies such as those of third-world nations. In addition to initial affordability, the present invention's conception of blades made of discrete sections makes it possible to repair turbine blades at a cost much lower than would be required for replacement of expensive molded or cast blades.

BRIEF DESCRIPTION OF THE DRAWINGS

FIG. 3c also shows the overlaying cross sections of the prior art helical blade and the present invention blade at the ends of the individual present invention blade members.

DETAILED DESCRIPTION OF THE PREFERRED EMBODIMENT

Figure 1:
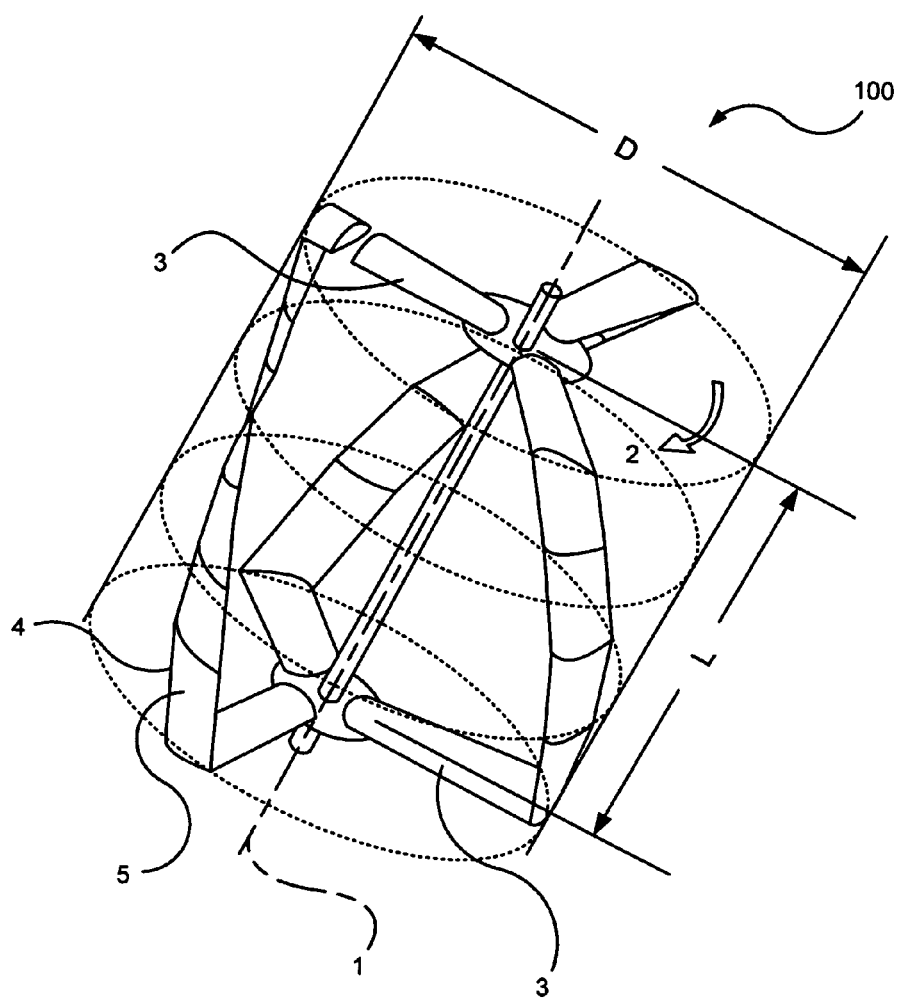
FIG. 1 is an isometric view of a first embodiment of the turbine of the present invention.

A first embodiment 100 of the invention is shown in FIG. 1. Three turbine blades, each comprised of four blade members 5, span the turbine longitudinal dimension L between three lower and three upper blade support members 3 of turbine 100 having an axis of rotation 1, a diameter D, and a direction of rotation 2 in the direction of the blade members' leading edges 4.

Figure 2A:
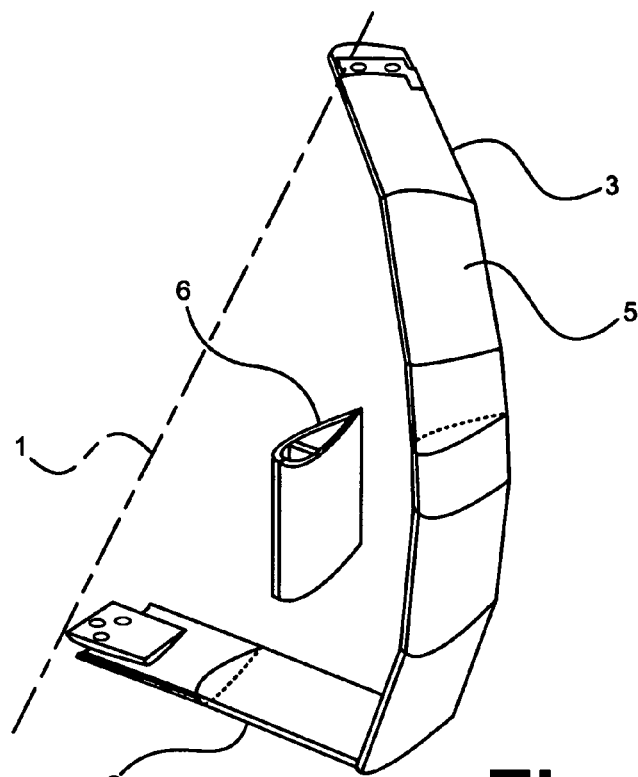
FIG. 2a is an isometric view of a first embodiment of a filled turbine blade member of the present invention.
Figure 2C:
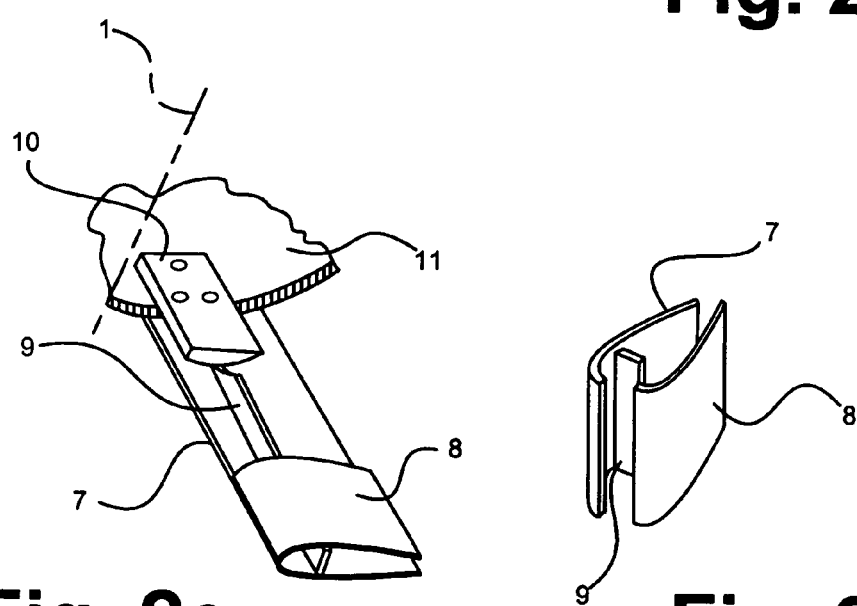
FIG. 2c is an isometric view of a first embodiment of a turbine blade support member attached to a member that is in turn attached to a turbine axis of rotation shaft member.
Figure 2B:
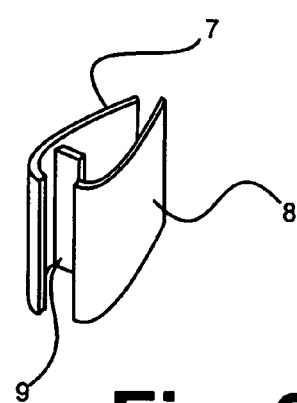
FIG. 2b is an isometric view of a first embodiment of a turbine blade member comprised of separate members.

Construction details of one embodiment of one blade of the invention are shown in FIGS. 2a, b, and c. The two blade support members 3 and four blade members 5 of a single turbine blade are shown in FIG. 2a positioned on turbine axis of rotation 1. FIG. 2a shows a blade member filled with foam 6. FIG. 2b shows the upper and lower parts 7 and 8 and a spacer 9 of a blade member as it might be assembled from separate pieces of sheet metal. FIG. 2c shows how a blade support member 3 might be constructed from two metal sheets 7 and 8, a spacer 9, and a connector block 10 that attaches blade support member 3 to a hub 11 or otherwise part of the turbine shaft that rotates about the turbine axis of rotation 1.

Figure 3C:
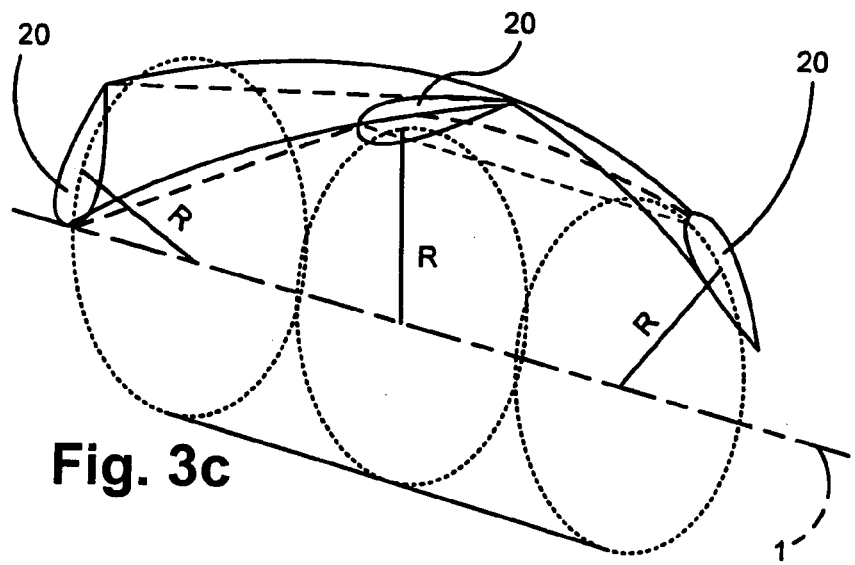
FIG. 3c is a comparison of the prior art blade of FIG. 3a (solid lines) with the present invention embodiment of FIG. 3b (dashed lines), both designed to lie on a turbine of radius R about an axis of rotation 1.
Figure 3B:
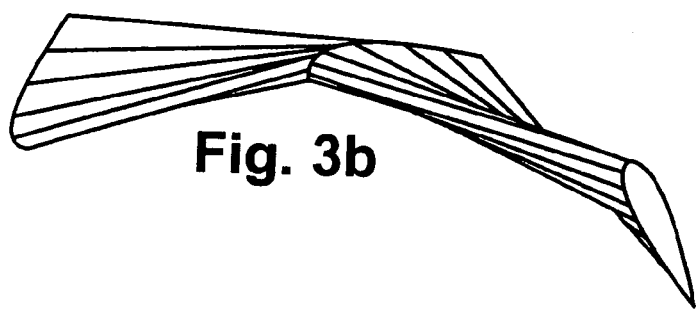
FIG. 3b is an isometric view of a first embodiment of two joined blade members of the present invention.
Figure 3A:
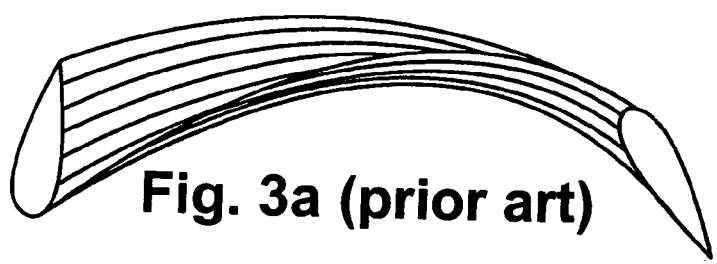
FIG. 3a is an isometric view of a prior art continuous helical turbine blade.

FIGS. 3a, b, and c compare the present invention to a blade of the Gorlov turbine (the '137 patent). FIGS. 3a and 3b depict, respectively, the Gorlov helical blade and a twisted straight blade of the present invention. FIG. 3c shows a Gorlov helical blade (solid lines) and a blade of the present invention (dashed lines) superimposed on the periphery of a turbine having a radius R. FIG. 3c shows three imaginary parallel planes perpendicular to the turbine axis of rotation 1, and the airfoil cross sections 20 at the locations where the three planes cut the blades.

Figure 4A:
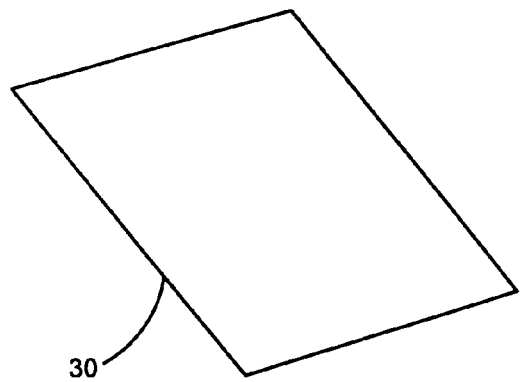
FIG. 4a shows a flat sheet that is the initial stage of an embodiment of the present invention.
Figure 4B:
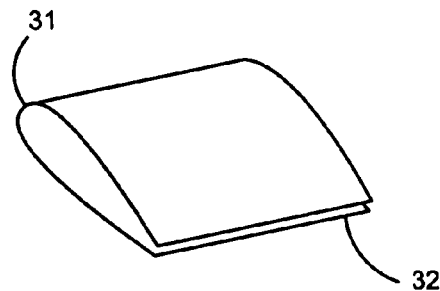
FIG. 4b shows the sheet of FIG. 4a as it appears after an airfoil forming operation.
Figure 4C:
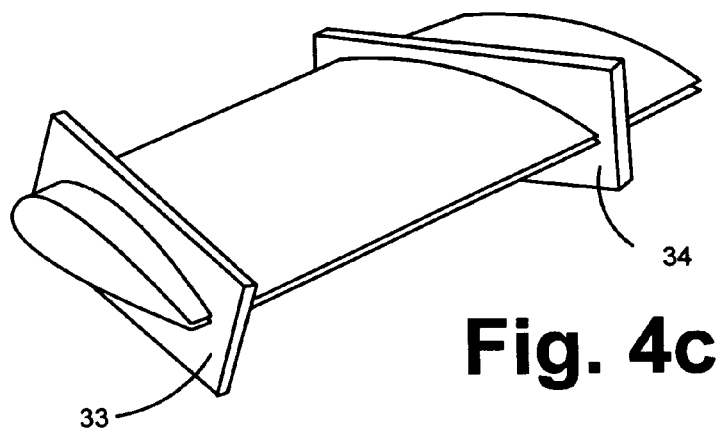
FIG. 4c shows the airfoil as it is being twisted by a set of forming tools, prior to or after the trailing edges 32 of FIG. 4b are joined.
Figure 4D:
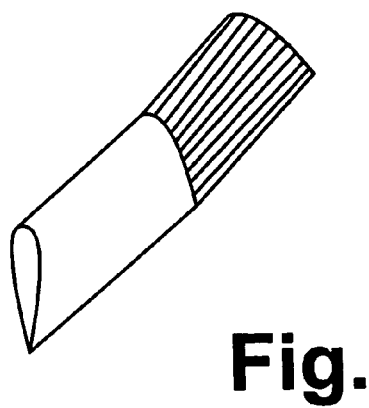
FIG. 4d shows two bent, twisted, and joined members 5 joined end-to-end to form part of a composite turbine blade of the present invention.

FIGS. 4a, b, c, and d shows the progression of operations required to manufacture a turbine blade of the present invention. FIGS. 4a and 4b show, respectively, a flat sheet in its original orientation and its symmetrical airfoil shape subsequent to a forming operation. The formed airfoil of FIG. 4b shows a closed, curved leading edge 31 and an open, straight trailing edge 32. FIG. 4c shows the airfoil of FIG. 4b inserted into two forms 33 and 34. While one form, say 34, is fixed, the other form 33 can be rotated to deform the airfoil to a desired twist. Depending on the airfoil material, it may retain its deformation with no post-twist treatment, or annealing may be required for permanent deformation fixation. FIG. 4d shows two individual turbine blade members 5 joined end-to-end to form a part of one of the present invention's complete turbine blades.

Figure 5A:
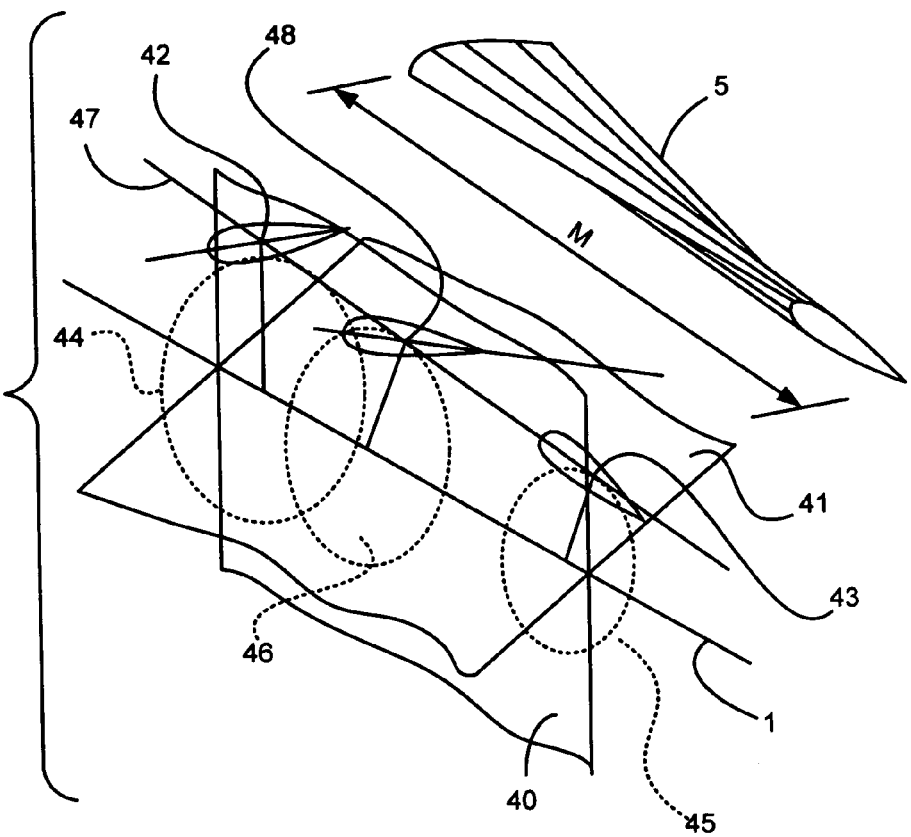
FIG. 5a shows how to determine the angle of twist that is to be applied to a turbine blade member having a length M so that the composite turbine blade of the present invention will approximate a helical turbine blade of radius R.

FIGS. 5a and b demonstrate how the angle of twist to be applied to a straight airfoil section is determined for practice of the present invention. First, any two different planes 40 and 41 containing the turbine axis of rotation 1 are defined as in FIG. 5a. Then points 42 and 43 are defined so that they lie, respectively, on planes 40 and 41, separated by a distance equal to the desired length M of a turbine blade member 5 at a distance R from axis 1. Points 42 and 43 are connected with a straight line 47 that becomes the locus of all the centers of pressure of the turbine blade member airfoil cross sections. For a helical blade approximation, locus line 47 will never lie in any plane containing the turbine axis of rotation 1. Blade member airfoil cross sections intermediate to member endpoints 42 and 43 will all lie on the straight line 47. For example, the airfoil cross section about point 48 will be tangent to the circular plane 46 that is defined by rotation about turbine rotation axis 1 of the line of length R from point 48 to axis 1.

Figure 5B:
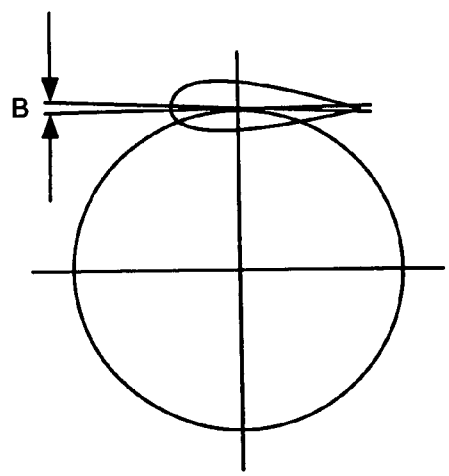
FIG. 5b shows the angle β that represents the symmetrical deviation from tangency allowed by the present invention.

The symmetrical airfoils for which points 42 and 43 are the centers of pressure are, respectively, tangent to circular planes 44 and 45 that are perpendicular to the rotation axis 1. Alternatively, the airfoils may deviate an angle β equal to plus or minus six degrees from a tangential orientation as shown in FIG. 5b. The angle of twist in a turbine blade member of the present invention is therefore defined as the twist required to join all the airfoil cross sections between points 42 and 43 with straight lines between corresponding points on their respective profiles.

Figure 6:
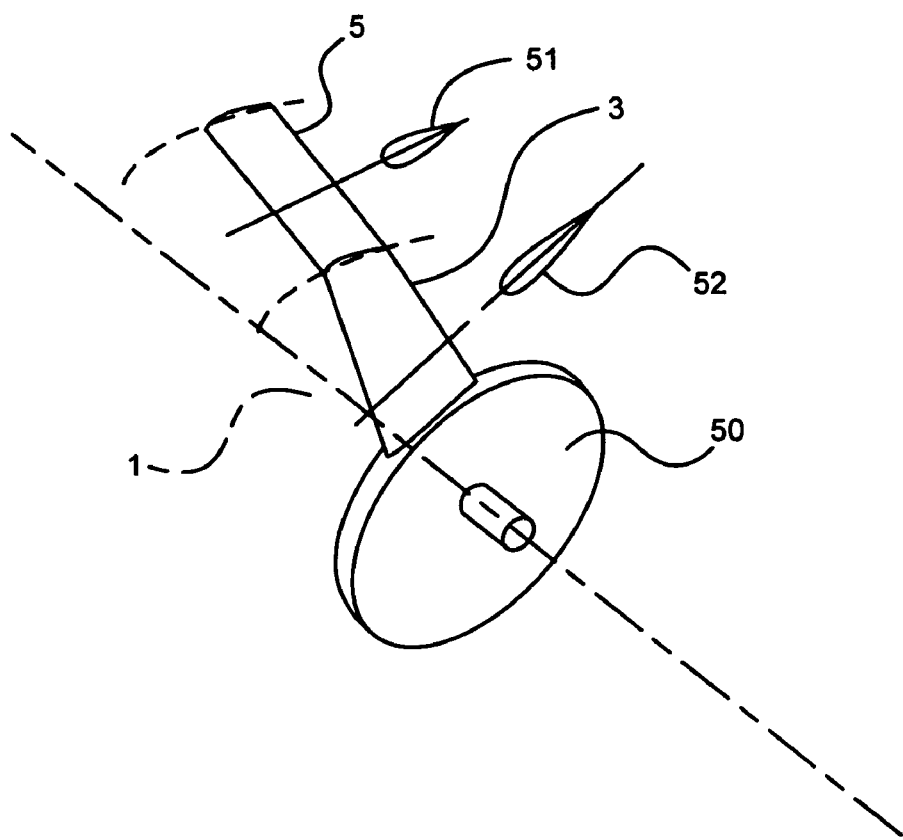
FIG. 6 shows one embodiment of the composite turbine blade of the present invention that discloses sections of varying cross section.

FIG. 6 shows a feature of the present invention whereby turbine blade support members 3 that are closer to the turbine axis of rotation 1 than turbine blade members 5 can contribute more effectively to the overall turbine torque output. It is well known and established that airfoils of the same size produce greater torque with greater moment arm. The present invention provides for varying cross section size of a blade support member so that its cross section increases with its proximity to the rotation axis. FIG. 6 shows that cross section 51 shared by blade member 5 and the mating end of blade support member 3 is smaller than cross section 52 of blade support member 3 close to the turbine shaft and hub 50. For contributions to a trubine's overall torque, the larger size of cross section 52 helps compensate for its decreased moment arm over cross section 51.

Another embodiment of the present invention permits blade members constructed so that the cross sections are shapes other than symmetric airfoils. For example, the blade members could be formed such that their cross section shapes are any of the various asymmetrical airfoils or other shapes such as wedges.

The turbine blade material of the present invention is not limited to metal. There are many engineered plastics susceptible to the forming, joining, and cutting operations required to construct the blades of the present invention.

Another embodiment of the present invention calls for filling some or all of the blade members. Filling can enhance rigidity and flotation, and can be accomplished before or after individual blade members are joined. Filling techniques, such as those commonly used to fill and seal heat pipes, are commonly understood to industry.

The order of application of the various blade production stages is immaterial. Blades of the present invention can be cut, bent, twisted, and closed in any order. Regardless of the order of the production stages, the end result is a plurality of discrete blade members, each having a predetermined length, two end angles, and an angle of twist so that when joined end-to-end into a composite blade, the composite blade is capable of approximating to a predetermined degree of acceptability the performance and efficiency of a continuous compound curvilinear turbine blade such as helical or tropskein blades.

While the present invention has been described in terms of one preferred embodiment and a few variations thereof, it will be apparent to those skilled in the art that form and detail modifications may be made to those embodiments without departing from the spirit or scope of the invention.

I claim:

1. A method of constructing a composite turbine blade, the method comprising:

identifying a turbine blade of continuous compound curvilinear design to be approximated by said composite turbine blade;

for discrete base members each having a leading edge and a trailing edge with respect to fluid flow over said base members, each said base member having a first and a second end cut, respectively, at a first and a second angle with respect to said base member leading edge, and each said base member twisted to a third angle such that said leading and trailing edges are not parallel, determining the quantity of said base members, and, for each said base member, the base member length and the first, second, and third angles required to approximate said continuous compound curvilinear turbine blade when said base members are joined end-to-end;

cutting a plurality of flat sheets so that each said sheet can be bent to conform to said determined length and said determined first, second, and third angles of a base member;

bending said flat sheets into a plurality of bent members so that each has a leading edge, two substantially parallel straight trailing edges, and two open ends;

twisting each said bent member to its said determined third angle;

before or after said twisting step, joining said two trailing edges of each said bent member into a single trailing edge to form a plurality of prepared blade members; and joining a plurality of said prepared blade members end-to-end to create a composite turbine blade approximating said continuous compound curvilinear turbine blade, said composite turbine blade in cooperation with at least one other substantially matching composite turbine blade being capable of unidirectionally rotating a turbine about a first axis of rotation under the influence of reversible fluid flow.

2. The method of claim 1 wherein said composite turbine blade has an airfoil cross section.

3. The method of claim 1 wherein said flat sheets are made of metal.

4. The method of claim 1 wherein said flat sheets are made of engineered plastic.

5. The method of claim 1 wherein at least a part of any hollow portion of one or more of said base members is filled.

6. A method of constructing a composite turbine blade, the method comprising:
- identifying a turbine blade of continuous compound curvilinear design to be approximated by said composite turbine blade;
- for discrete base members each having a leading edge and a trailing edge with respect to fluid flow over said base members, each said base member having a first and a second end cut, respectively, at a first and a second angle with respect to said base member leading edge, and each said base member twisted to a third angle such that said leading and trailing edges are not parallel, determining the quantity of said base members, and, for each said base member, the base member length and the first, second, and third angles required to approximate said continuous compound curvilinear turbine blade when said base members are joined end-to-end;
- bending a plurality of flat sheets into a plurality of bent members so that each has a leading edge, two substantially parallel straight trailing edges, and two open ends;
- twisting each said bent member to its said determined third angle into a prepared member;
- before or after said twisting step, cutting each said bent member so that each said bent member conforms to said determined length and said determined first and second angles of said base member;
- before or after said twisting and cutting steps, joining said two trailing edges of each said bent member into a single trailing edge to form a plurality of prepared blade members; and
- joining a plurality of said prepared blade members end-to-end to create a composite turbine blade approximating said continuous compound curvilinear turbine blade, said composite turbine blade in cooperation with at least one other substantially matching composite turbine blade being capable of unidirectionally rotating a turbine about a first axis of rotation under the influence of reversible fluid flow.

7. The method of claim 6 wherein said composite turbine blade has an airfoil cross section.

8. The method of claim 6 wherein said flat sheets are made of metal.

9. The method of claim 6 wherein said flat sheets are made of engineered plastic.

10. The method of claim 6 wherein at least a part of any hollow portion of one or more of said base members is filled.

11. A method of constructing a composite turbine blade, the method comprising:
- identifying a turbine blade of continuous compound curvilinear design to be approximated by said composite turbine blade;
- for discrete base members each having a leading edge and a trailing edge with respect to fluid flow over said base members, each said base member having a first and a second end cut, respectively, at a first and a second angle with respect to said base member leading edge, and each said base member twisted to a third angle such that said leading and trailing edges are not parallel, determining the quantity of said base members, and, for each said base member, the base member length and the first, second, and third angles required to approximate said continuous compound curvilinear turbine blade when said base members are joined end-to-end;
- extruding a plurality of members having said leading and trailing edges, said leading and trailing edges being closed to form a plurality of extruded members;
- cutting said extruded members to form a plurality of prepared extruded members so that each said prepared extruded member conforms to said determined length and said determined first and second angles of said base member;
- before or after said cutting step, twisting each said extruded member to its said determined third angle to form a plurality of prepared blade members;
- joining a plurality of said prepared blade members end-to-end to create a composite turbine blade approximating said continuous compound curvilinear turbine blade, said composite turbine blade in cooperation with at least one other substantially matching composite turbine blade being capable of unidirectionally rotating a turbine about a first axis of rotation under the influence of reversible fluid flow.

12. The method of claim 11 wherein said composite turbine blade has an airfoil cross section.

13. The method of claim 11 wherein said extruded members are made of metal.

14. The method of claim 11 wherein said extruded members are made of engineered plastic.

15. The method of claim 11 wherein at least a part of any hollow portion of one or more of said base members is filled.

16. A method of constructing a prepared turbine blade, the method comprising:
- identifying a turbine blade of continuous compound curvilinear design to be approximated by said prepared turbine blade constructed from a continuous extrusion formed into discrete straight sections;
- for discrete base sections each having a leading edge and a trailing edge with respect to fluid flow over said base sections, each said base section having a first and a second end angle with respect to said base section leading edge, and each said base section twisted to a third angle such that said leading and trailing edges are not parallel, determining the quantity of said base sections, and, for each said base section, the base section length and the first, second, and third angles required to approximate said continuous compound curvilinear turbine blade;
- extruding a member having said leading and trailing edges;
- twisting the said extruded member to its said determined first, second, and third angles to form a prepared turbine blade approximating said continuous compound curvilinear turbine blade, said prepared turbine blade in cooperation with at least one other substantially matching prepared turbine blade being capable of unidirectionally rotating a turbine about a first axis of rotation under the influence of reversible fluid flow.

17. The method of claim 16 wherein said composite turbine blade has an airfoil cross section.

18. The method of claim 16 wherein said extruded members are made of metal.

19. The method of claim 16 wherein said extruded members are made of engineered plastic.

20. The method of claim 16 wherein at least a part of any hollow portion of one or more of said base members is filled.

21. A turbine having one or more blades constructed of discrete straight members of uniform cross section that are joined to approximate a turbine blade of continuous compound curvilinear design wherein for any adjacent first and second turbine blades, a portion of said first turbine blade that connects with a first end of said turbine axis of rotation lies in substantially the same position with respect to said turbine axis of rotation as a portion of said second turbine blade that connects with said second end of said turbine axis of rotation.

22. The turbine of claim 21 having turbine blades wherein any cross section of said turbine blades perpendicular to said turbine axis of rotation is tangential, within an approximate plus or minus six degree range, to a circular plane containing said cross section and a turbine diameter.

23. The turbine of claim 21 wherein a straight line joining the centers of pressure of each cross section of any said discrete straight member does not lie in any plane containing said turbine axis of rotation.

24. The turbine of claim 21 wherein the fluid activating the turbine is water.

25. A turbine having one or more blades constructed of a continuous member of uniform cross section formed into discrete straight sections so that said formed continuous member approximates a turbine blade of continuous compound curvilinear design wherein for any adjacent first and second turbine blades, a portion of said first turbine blade that connects with a first end of said turbine axis of rotation lies in substantially the same position with respect to said turbine axis of rotation as a portion of said second turbine blade that connects with said second end of said turbine axis of rotation.

26. The turbine of claim 25 having turbine blades wherein any cross section of said turbine blades perpendicular to said turbine axis of rotation is tangential, within an approximate plus or minus six degree range, to a circular plane containing said cross section and a turbine diameter.

27. The turbine of claim 25 wherein a straight line joining the centers of pressure of each cross section of any said discrete straight section does not lie in any plane containing said turbine axis of rotation.

28. The turbine of claim 25 wherein the fluid activating the turbine is water.

29. A method of constructing a composite turbine blade, the method comprising:
   identifying an airfoil-shaped helical turbine blade to be approximated by said composite turbine blade;
   for discrete airfoil-shaped base members each having a leading edge and a trailing edge as commonly recognized in the aeronautical industry, each said base member having a first and a second airfoil-shaped end cut, respectively, at a first and a second angle with respect to said base member leading edge, and each said base member twisted to a third angle such that said leading and trailing edges are not parallel, determining the quantity of said base members, and, for each said base member, the base member length and the first, second, and third angles required to approximate said helical turbine blade when said base members are joined end-to-end;
   cutting a plurality of flat metal sheets so that each said sheet can be bent to conform to said determined length and said determined first, second, and third angles of said base member;
   bending said flat metal sheets into a plurality of said base members so that each has a curvilinear leading edge, two substantially parallel straight trailing edges, and two open, airfoil-shaped ends;
   twisting each said base member to its said determined third angle;
   joining said two trailing edges of each said base member into a single trailing edge to form a plurality of prepared blade members;
   joining a plurality of said prepared blade members end-to-end to create a composite turbine blade with an approximate helical shape, said composite turbine blade in cooperation with at least one other substantially matching composite turbine blade being capable of unidirectionally rotating a turbine about a first axis of rotation under the influence of reversible fluid flow.

30. A turbine having one or more composite turbine blades constructed according to the method in claim 29.

31. A method of constructing a composite turbine blade, the method comprising:
   identifying an airfoil-shaped troposkein turbine blade to be approximated by said composite turbine blade;
   for discrete airfoil-shaped base members each having a leading edge and a trailing edge as commonly recognized in the aeronautical industry, each said base member having a first and a second airfoil-shaped end cut, respectively, at a first and a second angle with respect to said base member leading edge, and each said base member twisted to a third angle such that said leading and trailing edges are not parallel, determining the quantity of said base members, and, for each said base member, the base member length and the first, second, and third angles required to approximate said troposkein turbine blade when said base members are joined end-to-end;
   cutting a plurality of flat metal sheets so that each said sheet can be bent to conform to said determined length and said determined first, second, and third angles of said base member;
   bending said flat metal sheets into a plurality of said base members so that each has a curvilinear leading edge, two substantially parallel straight trailing edges, and two open, airfoil-shaped ends;
   twisting each said base member to its said determined third angle;
   joining said two trailing edges of each said base member into a single trailing edge to form a plurality of prepared blade members;
   joining a plurality of said prepared blade members end-to-end to create a composite turbine blade with an approximate troposkein shape, said composite turbine blade in cooperation with at least one other substantially matching composite turbine blade being capable of unidirectionally rotating a turbine about a first axis of rotation under the influence of reversible fluid flow.

32. A turbine having one or more composite turbine blades constructed according to the method in claim 31.

33. A turbine having one or more blades constructed of discrete straight members of uniform cross section that are joined to approximate a turbine blade of continuous compound curvilinear design, wherein for any adjacent first and second said turbine blades, a portion of said first turbine blade that connects with a first end of said turbine axis of rotation lies in substantially the same position with respect to said turbine axis of rotation as a portion of said second turbine blade that connects with said second end of said turbine axis of rotation, and wherein any cross section of said turbine blades perpendicular to said turbine axis of rotation is tangential, within an approximate plus or minus six degree range, to a circular plane containing said cross section and a turbine diameter, and wherein a straight line joining the centers of pressure of each cross section of any said discrete straight member does not lie in any plane containing said turbine axis of rotation.

34. A turbine having one or more blades constructed of a continuous member of uniform cross section formed into discrete straight sections so that said formed continuous member approximates a turbine blade of continuous compound curvilinear design, wherein for any adjacent first and second said turbine blades, a portion of said first turbine blade that connects with a first end of said turbine axis of rotation lies in substantially the same position with respect to said turbine axis of rotation as a portion of said second turbine blade that connects with said second end of said turbine axis of rotation, and wherein any cross section of said turbine blades perpendicular to said turbine axis of rotation is tangential, within an approximate plus or minus six degree range, to a circular plane containing said cross section and a turbine diameter, and wherein a straight line joining the centers of pressure of each cross section of any said discrete straight member does not lie in any plane containing said turbine axis of rotation.

* * * * *